Aug. 24, 1926.

L. A. CHERRY 1,597,053

COMPUTING DEVICE

Filed August 10, 1922    3 Sheets-Sheet 1

Inventor:
Lester A. Cherry
by J. Wm. Ellis
Atty.

Aug. 24, 1926.

L. A. CHERRY 1,597,053

COMPUTING DEVICE

Filed August 10, 1922   3 Sheets-Sheet 2

Inventor.
Lester A. Cherry
by J. W. Ellis
Atty

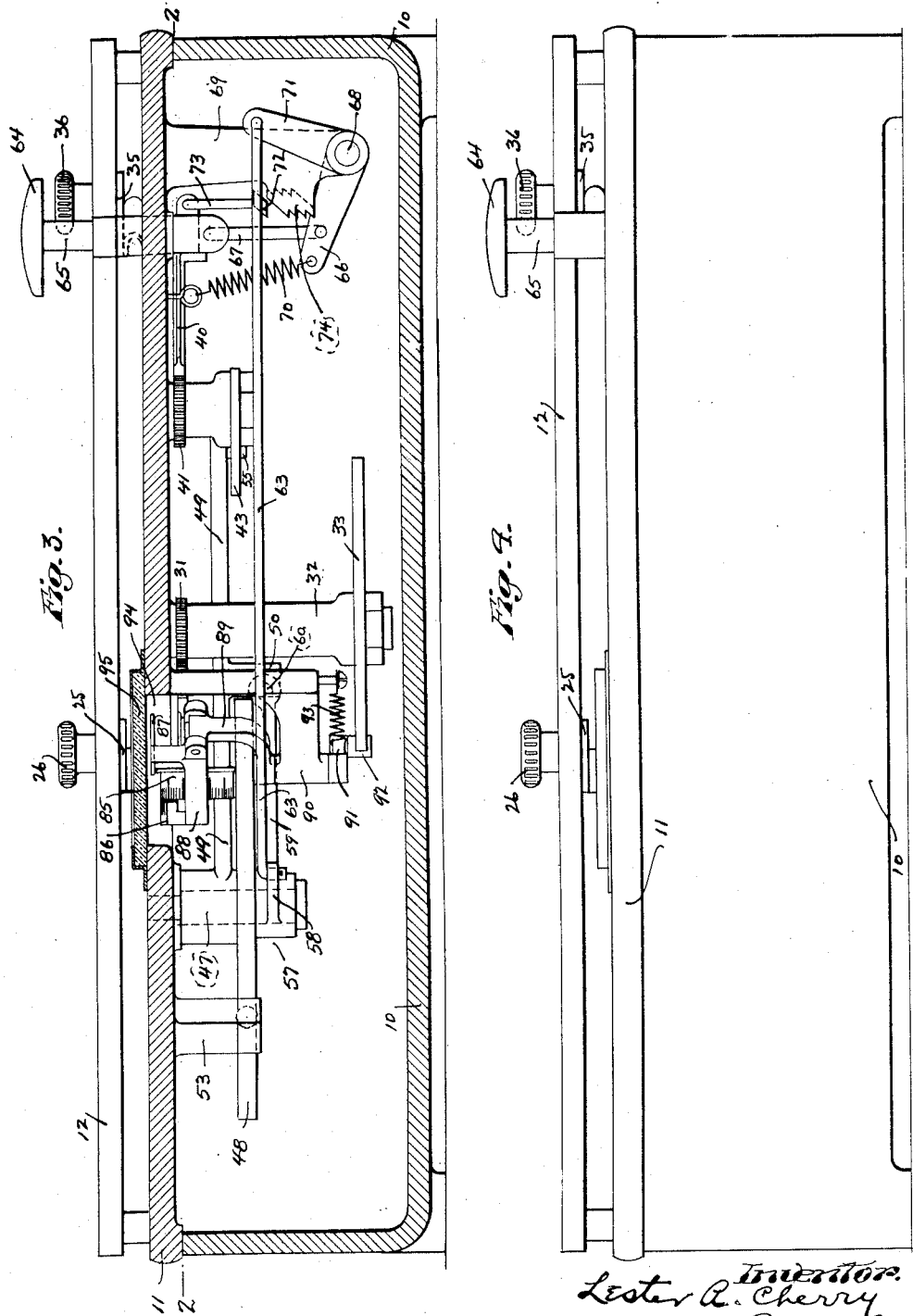

Patented Aug. 24, 1926.

1,597,053

UNITED STATES PATENT OFFICE.

LESTER A. CHERRY, OF KENMORE, NEW YORK.

COMPUTING DEVICE.

Application filed August 10, 1922. Serial No. 580,885.

My invention relates in general to computing devices and more particularly to the computation of the so-called "extension" used in the calculation of the flow of gases as measured by an orifice meter.

It is well known to those skilled in the art that in calculating the quantity of gas flowing through a meter of the orifice type, the following equation applies:

$$Q = C\sqrt{D(P+14.4)}$$

Where

Q = The quantity of gases passing.

C = A coefficient depending upon the specific gravity and other physical properties of the gas to be measured.

The remaining portion of this equation: namely, $$\sqrt{D(P+14.4)}$$

is called the "extension", where

D = A differential pressure on the two sides of the orifice of the meter, measured in inches of water.

P = The static pressure in the pipe-line below the orifice, measured in pounds per square inch.

14.4 = An assumed average atmospheric pressure.

It is evident that the extension equation as above written may be written to read $$\sqrt{D} \times \sqrt{P+14.4}.$$

It is well known to those skilled in the art that in the present method of measuring gas by means of an orifice meter, readings of the static and differential pressure gages are taken at frequent intervals, usually by means of recording gages. By means of elaborate and cumbersome tables which have been previously computed, the proper figure is found in the table, which shows the result which will be obtained by computing according to the above formula at each of the readings taken from the gages or the charts made by them. This method is not only laborious, but due to the numerous readings necessary during a day's run, there is a large possibility of error.

The principal object of my invention has been to provide a device having a cam which, through its associated parts, shall produce the value of the $$\sqrt{D};$$

and also a cam which, with its associated parts, shall produce the value of the $$\sqrt{P+14.4}.$$

Another object has been to provide a device in which a planimeter may be used to obtain the product of the square roots, above referred to.

Another object of my invention has been to provide a device, which shall do away with the tables above referred to, and thus accurately and easily perform the computations in the least possible time.

My invention involves the use of a device by which the computations may be made from the charts taken from the recording static and pressure gages used in orifice meters.

Moreover, my device is of such a nature that it may be inexpensively manufactured; and is so simple in its construction and operation that it may be successfully used by an inexperienced person with minimum possibility of error.

The above objects and advantages have been accomplished by the device shown in the accompanying drawings, of which:

Fig. 3 is a front sectional elevation of the device taken on line 3—3 of Fig. 2.

Fig. 4 is a front, exterior view of the device.

My device comprises a casing 10 and a cover 11, to which all of the working parts of the device are attached. A bridge 12 is secured across the top of the cover and is arranged in interspaced relation therewith and provides a support for the hands when operating the device as hereinafter pointed out.

Figure 1:
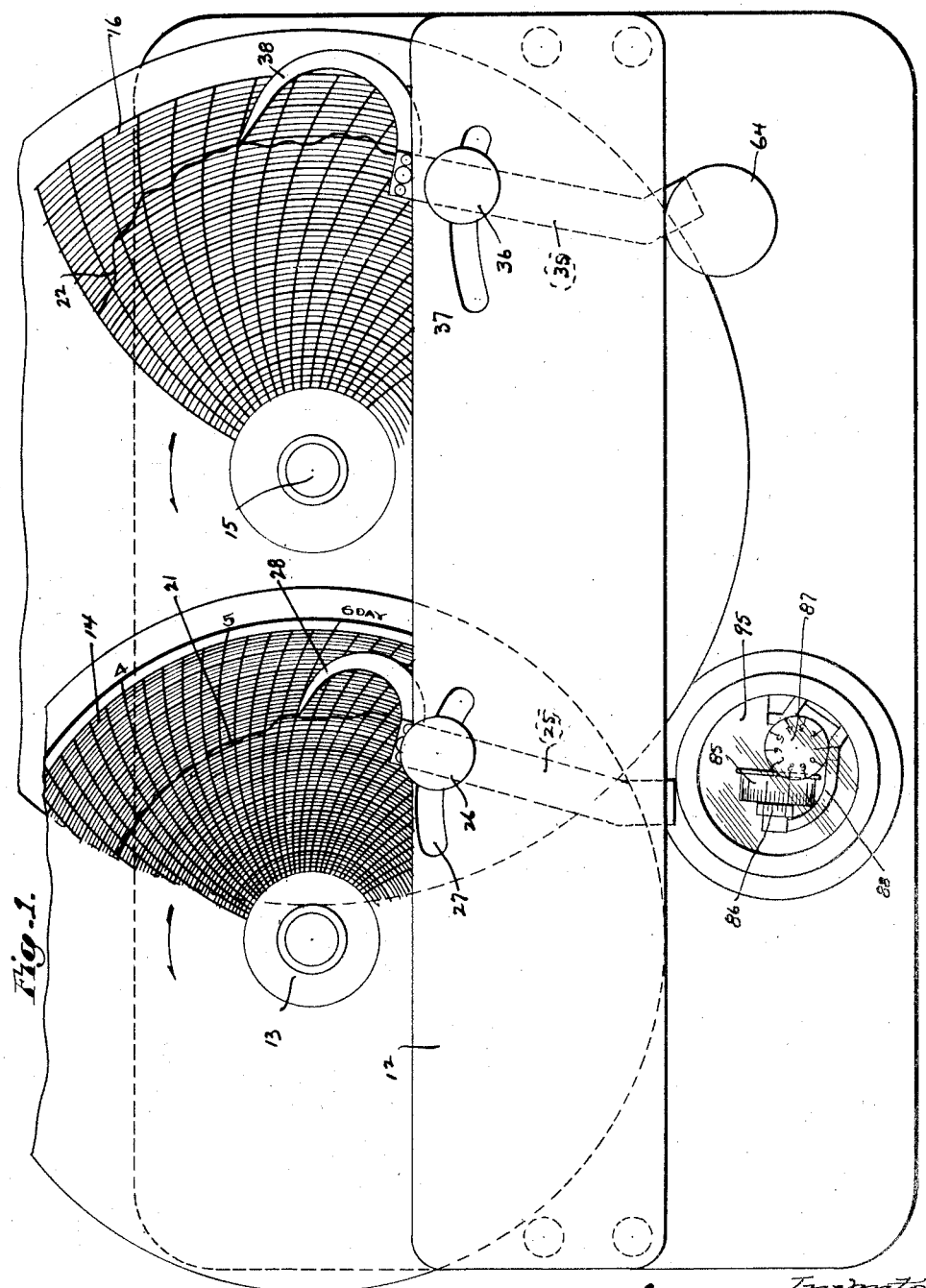
Fig. 1 is an exterior, plan view of the complete device.

My device, as shown in the drawings, is designed for use in connection with the circular charts of recording gages used in orifice meters, but it may also be used with continuous charts, if desired. In the device a spindle 13 is provided for the static-gage chart 14, and a spindle 15 is provided for the differential-gage chart 16. As shown in Fig. 1, these charts are arranged with portions thereof overlapping each other, so that a comparatively small space will be occupied by them. Each of the spindles is provided with suitable means for mounting the charts and temporarily securing them to the spindle. The curve 21 on the static chart 14 represents the movement of the meter, of the recording static-gage, and the curve 22 of the differential chart 16 represents the movement of the recording differential gage. A static-chart arm 25 is disposed immediately under the bridge 12 and has an operating button 26 carried near its outer end and disposed in an arcuate slot 27. This arm has a pointer 28 arranged at its outer end and so shaped that the curve 21 may be conveniently seen at both sides of the pointer, whereby the pointer may be accurately set. The inner end of the static-chart arm extends beyond the outer periphery of the static-chart 14 when in position, and it is bent inwardly upon itself, the inwardly bent end lying in interspaced relation with the other part of the arm, whereby the chart is free to move within this space. The inwardly bent end of the static-chart arm 25 is carried by a short shaft 29, which is suitably mounted in the cover 11. The other end of the shaft 29 carries a static-gear segment 30. This gear segment meshes with a static-gear pinion 31, which is rotatably supported by a shaft 34 rigidly carried by the cover 11 of the device and secured to a sleeve 32, having a static cam 33, secured at its lower end, to be hereinafter described.

At the right of the static-chart arm 25 is provided a differential-chart arm 35, which is provided with an operating button 36, movable in an arcuate slot 37 formed in the bridge 12. This arm is also provided with a pointer 38 at its outer end. The inner end of this chart arm is bent upon itself in interspaced relation like the static-chart arm 25, and its bent end is secured to a vertical shaft 39. The shaft 39 carries a differential-gear segment 40, which meshes with a differential-gear pinion 41. The gear pinion 41 is rotatably mounted upon a shaft 42 carried by the cover 11, and a differential cam 43 is rotatable with the pinion. The chart arms 25 and 35 are made of a length substantially the same as the length of the arms on the recording gages, and it is obvious that these arms are moved to the right or to the left in following the curves of the charts, and will, through the gear segments and pinions described, move the cams 33 and 43.

Figure 2:
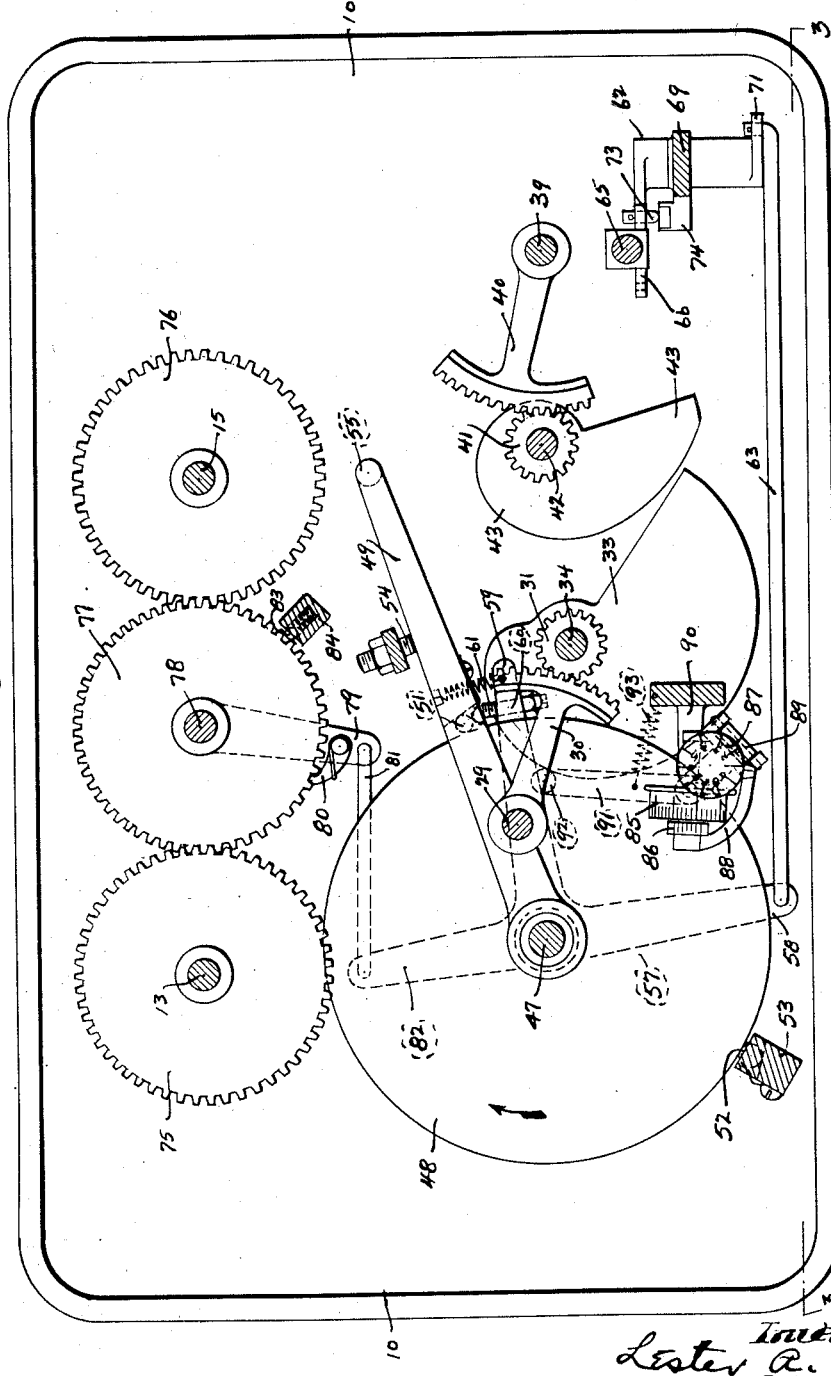
Fig. 2 is a sectional plan view taken on line 2—2 of Fig. 3.

A shaft 47 is carried by the cover 11 and a planimeter disc 48 is rotatably mounted thereon. An actuating arm 49 is also rotatably carried by the shaft 47 and is preferably mounted above the planimeter disc 48. This arm is provided with a downwardly extending lug 50, which carries a ball-clutch 51 (Figs. 2 and 3). This ball-clutch is engageable with the periphery of the planimeter disc, whereby the disc is rotated when the actuating arm is operated. A stationarily arranged ball-clutch 52 is carried by a depending arm 53, made preferably a part of the cover 11. This stationary ball-clutch keeps the disc 48 in the position to which it has been moved by the actuating arm 49. An adjustable stop-screw 54 is carried by the cover 11 and limits the movement of the operating arm in one direction. A roller 55 is carried in the outer end of the operating arm 49 and engages with the periphery of the differential cam 43 when the arm is operated. Also rotatably mounted upon the shaft 47, and preferably below the disc 48 is a bell-crank lever 57 having arms 58 and 59. The arm 59 carries an adjustable stop 60, which is engageable with the lug 50 of the actuating arm 49, and is held in engagement therewith by means of a spring 61. The arm 58 is connected to the actuating mechanism 62 of the device by means of a link 63.

The actuating mechanism comprises a button 64, which is arranged in a position to be operated by the wrist of the right hand without the necessity of taking the thumb and fore-finger from the knob 36 of the differential-chart arm 35. This button 64 is carried by a spindle 65 which is slidably mounted in the cover 11. The lower end of the spindle is connected with a lever 66 by means of a link 67. The lever 66 is attached to one end of a shaft 68, which is rotatably mounted in a downwardly extending arm 69 carried by the cover. The lever 66 and, therefore, the button 64 are maintained in their normal positions by means of a spring 70. Carried by the opposite end of the shaft 68 is a lever 71, to which one end of the link 63 is connected. So as to make it necessary to actuate the operating button 64 to the full limit of its movement, I provide a pawl 72, which is carried at the lower end of the link 73, and has its upper end pivotally attached to the spindle 65. This pawl is preferably diamond-shaped and is engageable with teeth formed on each side of a lug 74, carried by the arm 69. These teeth are so arranged that when the button is pressed downwardly, the ratchet pawl will move over the teeth at the outside of the lug and when it has moved to its lowermost position the pawl will swing inwardly and move over the inner teeth when the button moves upwardly. It will be seen that if the button is not pushed all the way down, that the pawl will engage with one of the teeth on the outside of the lug 74, and prevent its return to normal position.

Carried by the static-chart spindle 13 is a gear 75, and carried by the differential-chart spindle 15 is a gear 76. These gears are connected by means of a gear 77, which is rotatably mounted on a shaft 78. The shaft 78 carries a pawl arm 79, which is provided with a pawl 80 for engagement with the teeth of the gear 77. The pawl arm is connected by means of a link 81 to an arm 82, which is made preferably a part of the bell-crank lever 57. A ball-shaped pawl 83 is carried by a lug 84 and in contact with the teeth of the gear 77, so that this gear will be maintained in its position while the pawl 80 is riding over the teeth thereof.

Arranged for engagement with the surface of the planimeter disc 48 is a planimeter 85 preferably having a vernier 86 and a counting wheel 87. The planimeter is mounted in a yoke 88 which is pivotally carried by a planimeter arm 89, whereby the planimeter will be held in contact with the surface of the disc by gravity. The arm 89 has its lower end bent inwardly so that the axis of the shaft to which it is attached lies immediately below the point of contact of the planimeter with the disc 48. The planimeter arm shaft is carried by the bracket 90, forming preferably a part of the cover 11, and it has secured to its lower end a cam arm 91. This cam arm has a roller 92 at its outer end which is engageable with the periphery of the static cam 33. A spring 93 serves to keep the roller 92 in bearing contact with the cam.

The static cam 33 is so proportioned that it will determine that part of the equation, hereinbefore stated, which is indicated by $$\sqrt{P+14.4}.$$

Likewise, the differential cam 43 is so proportioned that it will determine that part of the equation which is indicated by $$\sqrt{D}.$$

From the foregoing, it will be clear that the position of the static cam 33 will, through the arm 91, govern the axial position of the planimeter wheel 85 with respect to a radial line drawn through the disc 48 and the point of contact of the wheel with the disc, which will determine the proportionate amount of roll and slide of the planimeter wheel; and that the position of the differential cam 43 will determine the amount of movement of the actuating arm 49 and hence the amount of rotation of the planimeter disc 48. It will, therefore, be clear that the amount of movement of the planimeter wheel will give the product of $$\sqrt{D} \times \sqrt{P+14.4}$$

at each setting and each operation of the device.

All the parts of my device are preferably inclosed within the casing 10 and cover 11. So as to be able to read the planimeter, I provide an opening 94 through the cover, immediately above the wheel 85, and cover this opening with a glass window 95, secured in position by any well known means.

Having thus described my invention, I will now describe its operation.

A static-gage chart 14, is placed upon the spindle 13, and a differential-gage chart 16 is placed upon the spindle 15. These charts are rotated until the same hour lines are under the pointers 28 and 38. The charts are then clamped in position by the means provided and the device is ready to be operated. A reading of the planimeter is now taken which corresponds to the first reading of any gas meter or counting device. The pointer 28 is now brought in register with the curve 21 of the static chart 14, and the pointer 38 is brought in register with the curve 22 of the differential chart 16. The movement of the static-chart arm 25, in bringing its pointer 28 on the curve 21, determines the position of the static cam 33 and hence the angular position of the axis of the planimeter. The operation of the differential-chart arm 35 determines the position of the differential cam 43. The button 64 is now depressed by the wrist of the right hand, without necessarily removing the thumb and fore-finger from the operating knob 36 of the differential-chart arm 35. As the button is depressed the link 63 will be moved to the left (as shown in the drawings) and the arm 58 of the bell-crank lever 57 will be rotated in a clockwise direction. The arm 59 of the bell-crank lever 57 will be moved in the same direction; and, through the medium of the spring 61 which connects it to the actuating arm 49, this arm will also be operated and moved in a clockwise direction to a point where its roller 55 will engage with the periphery of the differential cam 43, when its motion will be stopped. If this motion is less than the motion imparted to the arm 59 of the bell-crank lever 57 by the depression of the button 64, the arm 59 will be allowed to move its maximum distance because of the spring connection 61 between it and the actuating arm 49. As the arm 49 is operated in a clockwise direction, the ball clutch 51 being in engagement with the periphery of the planimeter disc 48, it will cause a rotation of the disc depending upon the amount of movement of the arm 49. Simultaneously with the movement of the bell-crank lever just above described there will be a movement of the pawl arm 79 caused by the movement of the arm 82 and link 81. This movement will cause the pawl 80 to ride over the teeth of the gear 77 and to come into engagement with one of the teeth when the arm has come to rest. As hereinbefore pointed out, it is necessary that the button 64 be operated to its maximum distance because of the pawl 72. Since the movement of the spindle 65 carrying the button 64 is the same at each operation, it is obvious that the pawl arm 79 will be moved the same distance each time it is operated.

When pressure upon the button 64 is released, the spring 70 will draw it back to its initial position. This will permit the spring 61 to draw the stop 60, carried by the arm 59 of the bell-crank lever 57, in engagement with the actuating arm 49, and thus carry the arm 49 back to its normal position against the stop 54. During this return movement, the ball-clutch 51 will be released and the stationary ball-clutch 52 will serve to retain the planimeter disc 48 in its set position. The return movement will also draw the pawl arm 79 to its normal position and will rotate the gear 77 through a definite and predetermined distance because of the engagement of the pawl 80 with the teeth thereon. Since the gear 77 is in mesh with the gears 75 and 76, carried by the spindles 13 and 15, respectively, the charts carried by the spindles will be rotated a definite distance, whereby a different portion of the curves 21 and 22 will be brought in registrable positions with the pointers 28 and 38, respectively. The pointers are then moved so as to register with the respective curves which cause the cams and their co-acting parts to be set in new positions, whereupon the button 64 is again depressed and the planimeter disc 48 again rotated a distance corresponding to the setting of the differential cam 43, as hereinbefore described. During such resetting movement, the static cam 33 will determine the new angular relation of the planimeter wheel, as hereinbefore described. Each time the device is operated, the charts are thus rotated a predetermined distance, which may be at any desired interval on the charts. Each pointer is moved to a new position at each interval, if such new position is found necessary by the paths of the curves, and the cams are thus set at each interval. The planimeter disc is rotated at each interval and the planimeter wheel is also rotated for each movement of the planimeter disc. The device is thus operated at each interval until the last time interval has been reached, at which time the reading of the planimeter wheel with its counting wheel and vernier is taken. The initial reading of the planimeter wheel is now subtracted from the final reading and the difference will be the total of the extensions for the time period involved.

In the foregoing description and in the appended claims, I have used the term planimeter, but it will be clear that I use only the wheel of a planimeter and it is to this that the term applies.

While I have shown and described my device as being used with two separate circular charts, it is obvious that it is within the scope of the invention to use the device in connection with a continuous chart or with a circular chart having both the static and differential curves inscribed thereon. Furthermore, instead of controlling the position of the planimeter wheel by means of the static chart curve and the degree of rotation of the planimeter disc by the differential chart curve, these may be reversed and the disc rotated by the static curve while the position of the planimeter may be controlled by the differential curve. Moreover, a foot lever may be employed to operate the spindle 65 instead of operating it by the wrist.

These and other modifications of the details herein shown and described may be made without departing from the spirit of my invention, or the scope of the appended claims; and I do not, therefore, wish to be limited to the exact embodiment herein shown and described, the forms shown being merely a preferred embodiment thereof.

Having thus described my invention, what I claim is:

1. A computing device comprising a planimeter disc, a planimeter operated by the disc, means for rotating the disc, and a cam for governing the amount of such rotation.

2. A computing device comprising a planimeter disc, a planimeter operated by the disc, means for rotating the disc, a cam for governing the amount of rotation of the disc, and a cam for setting the planimeter.

3. A computing device comprising a planimeter disc, a planimeter operated by the disc, means for rotating the disc, and a cam for setting the planimeter.

4. A computing device comprising a planimeter disc, a planimeter operated by the disc, means for rotating the disc, a cam for governing the amount of rotation of the disc, and a cam for setting and thereby determining the angular position of the axis of the planimeter with respect to a radial line drawn through the center of the disc, and the point of contact of the planimeter with the disc.

5. The combination with differential and static gage charts, of a computing device comprising a planimeter disc, a planimeter operated by the disc, means for rotating the disc, pointers for the charts, means for registering the pointers with the curves of the charts, and means controlled by the movement of the pointers for setting the planimeter and for determining the amount of rotation of the disc.

6. The combination with differential and static gage charts, of a computing device comprising a planimeter disc, a planimeter operated by the disc, means for rotating the disc, pointers for the charts, means for registering the pointers with the curves of the charts, means controlled by the movement of the pointers for setting the planimeter and for determining the amount of rotation of the disc, and means for moving the charts a predetermined distance each time the disc is actuated.

7. The combination with differential and static gage charts, of a computing device comprising a planimeter disc, a planimeter operated by the disc, an operating button, and means associated with the button for moving the disc and the charts.

8. The combination with differential and static gage charts, of a computing device comprising a planimeter disc, a planimeter operated by the disc, pointers for the charts, means for registering the pointers with the curves of the charts, means controlled by the movement of the pointers for setting the planimeter and for determining the amount of rotation of the disc, an operating button, and means associated with the button for moving the disc and the charts.

9. The combination with differential and static gage charts, of a computing device comprising a planimeter disc, a planimeter operated by the disc, means for rotating the disc, pointers for the charts, means for registering the pointers with the curves of the charts, cams controlled by the movement of the pointers, and means associated with the cams for setting the planimeter and for determining the amount of movement of the disc.

10. A computing device comprising a planimeter disc, a planimeter operated by the disc, an actuating arm movable relative to the disc, means connecting the arm with the disc for causing the rotation of the disc in one direction only, regulatable means for limiting the movement of the arm, and means for setting the planimeter.

11. A computing device comprising a planimeter disc, a planimeter operated by the disc, an actuating arm movable relative to the disc, means connecting the arm with the disc for causing the rotation of the disc in one direction only, cam means for limiting the movement of the arm, and cam means for setting the planimeter.

12. A computing device comprising a planimeter disc, a planimeter operated by the disc, an actuating arm movable relative to the disc, means connecting the arm to the disc for causing the rotation of the disc in one direction only, a bell-crank lever movable relative to the disc, resilient means for connecting one arm of the bell-crank lever to the actuating arm, an adjustable stop between the arms, and means connected with the other arm of the bell-crank lever for moving it a pre-determined distance.

13. A computing device comprising a planimeter disc, a planimeter operated by the disc, an actuating arm movable relative to the disc, means connecting the arm with the disc for causing the rotation of the disc in one direction only, a bell-crank lever movable relative to the disc, resilient means for connecting one arm of the bell-crank lever to the actuating arm, an adjustable stop between the arms, means connected with the other arm of the bell-crank lever for moving it a pre-determined distance, means for stopping the movement of the actuating arm, and means for setting the planimeter.

14. The combination with differential and static gage charts, of a computing device comprising a planimeter disc, a planimeter operated by the disc, means for rotating the disc, pointers for the charts, means for registering the pointers with the curves of the charts, means controlled by the movement of the pointers for setting the planimeter and for determining the amount of rotation of the disc, and means for moving the charts a pre-determined amount each time the disc is actuated, comprising a button, a bell-crank lever connected with the button, and means connecting the bell-crank lever with the spindles.

15. The combination with the differential and static gage charts, of a computing device comprising spindles for the charts, a planimeter disc, a planimeter operated by the disc, means for rotating the disc, pointers for the charts, means for registering the pointers with the curves of the charts, means controlled by the movement of the pointers for setting the planimeter and for determining the amount of rotation of the disc, and means for moving the charts a pre-determined amount each time the disc is actuated, comprising a button, a bell-crank lever connected with the button, a gear mounted on each spindle, an idler gear meshing with the two spindle gears, and ratchet means associated with the idler gear and the bell-crank lever for moving the charts a pre-determined amount.

16. A computing device comprising a planimeter disc, a planimeter operated by the disc, and so mounted that it may be rotated around the point of contact of its perimeter with the disc, means for rotating the disc, and cam for governing the amount of rotation thereof.

17. A computing device comprising a planimeter disc, a planimeter operated by the disc, and so mounted that it may be rotated around the point of contact of its perimeter with the disc, an arm for controlling the position of the planimeter, a cam for setting the position of the arm, and means for rotating the disc.

18. A computing device comprising a planimeter disc, a planimeter operated by the disc, and so mounted that it may be rotated around the point of contact of its perimeter with the disc, an arm for controlling the position of the planimeter, a cam for setting the position of the arm, means for rotating the disc, and a cam for governing the amount of such rotation.

19. A computing device comprising a planimeter disc, having its axis vertically arranged, a planimeter arm pivotally mounted below the disc and having its axis parallel with the axis of the disc, a yoke pivotally mounted on the arm in a horizontal plane, a planimeter carried by the yoke, and engageable with the surface of the disc, means for rotating the disc, and means for setting the position of the planimeter.

In witness whereof, I have hereunto signed my name.

LESTER A. CHERRY.